United States Patent [19]

Tohme

[11] 4,361,117

[45] Nov. 30, 1982

[54] POULTRY FEEDER WITH AUTOMATIC CUTOFF

[76] Inventor: Ricardo J. Tohme, 1105 Regency Rd., NW., Atlanta, Ga. 30327

[21] Appl. No.: 285,309

[22] Filed: Jul. 20, 1981

[51] Int. Cl.³ .............................................. A01K 5/02
[52] U.S. Cl. ................................................. 119/52 B
[58] Field of Search ............. 119/52 B, 52 AF, 51.11; 222/55, 56, 411

[56] References Cited

U.S. PATENT DOCUMENTS

| 3,156,215 | 11/1964 | Barker ................................ | 119/52 B |
| 3,415,228 | 12/1968 | Myers ................................ | 119/51.11 |
| 3,561,404 | 2/1971 | Ferris et al. ...................... | 119/56 |
| 4,195,594 | 4/1980 | Siciliano et al. .................. | 119/52 B |

Primary Examiner—Hugh R. Chamblee
Attorney, Agent, or Firm—George M. Thomas

[57] ABSTRACT

A poultry feed hopper for distributing feed along an elongate feeding trough includes a feed container portion having a discharge outlet, a helical auger for urging feed from the container towards the discharge outlet, and a feed level detector paddle which detects the accumulation of feed in the trough and retards the rotation of the auger and the urging of feed towards the discharge outlet until the hopper has passed over the accumulation of feed. The auger is prevented from rotation by a detent on the feed level detector paddle when the feed in the trough accumulates to a level which prevents the free flow of feed through the discharge outlet and builds up behind the paddle. When the hopper passes to a point along the trough where there is no accumulation of feed, the accumulation behind the paddle dissipates and a counterweight urges the paddle and the detent away from engagement with the auger, thereby allowing the auger to again urge feed towards the discharge outlet.

5 Claims, 3 Drawing Figures

POULTRY FEEDER WITH AUTOMATIC CUTOFF

BACKGROUND

1. Field of the Invention

The present invention relates in general to animal feed hoppers for distributing animal feed into an elongated feeding trough. More specifically, the present invention relates to a feed hopper for moving along the length of an elongated feed trough and dispensing animal feed into the trough and which is capable of detecting an accumulation of feed in the trough and shutting off the flow of feed from the hopper to the trough when the hopper encounters an accumulation of feed in the trough.

2. Description of the Prior Art

In the production of eggs from chickens and other fowl, the birds can be contained in cages which are arranged in long rows of individual cages, each cage being capable of housing several birds. These cage rows are often stacked vertically, one row upon the other, in order to maximize use of space.

Automatic equipment is used to feed and water the birds, to remove manure from the cages and to collect eggs from the cages. The feeding of the birds in large scale poultry operations is often accomplished by distributing food into an elongate U-shaped trough which extends externally along the length of each row of a plurality of rows of cages and into which bulk feed is distributed. The feed can be distributed either manually or by a bulk feed distribution machine which travels the length of each trough, distributing bulk feed into the trough. In facilities employing feed distribution machines, predetermined amounts of feed are dispensed by metering devices in the movable feed distribution machines and then progressively distributed by the feed distribution machines into the feed troughs in a continuous flow over the length of the trough. At periodic intervals, the distribution machines automatically fill themselves at one end of the trough and then traverse the length of the trough and replenish the supply of feed in the trough by distributing the predetermined amount of feed into the trough.

Birds at various stages of their growth consume different quantities of feed, so that birds in the most rapidly growing stage of their lives consume greater quantities than extremely small birds or mature birds. Individual birds also have differing feed requirements; some birds are naturally more aggressive than others and consume voraciously while shoving smaller or weaker birds of similar age aside when food is distributed. Consequently, it has proven difficult to automatically and efficiently distribute poultry feed along a feeding trough in many large scale poultry raising operations. The problem is especially acute in poultry raising facilities which house birds of greatly differing ages and sizes in the same row of cages. Insufficient quantities of feed are often distributed to cages housing several rapidly growing birds, while food accumulates in areas of the trough adjacent to empty cages, cages only having one or two birds, and cages having very small birds. The indiscriminate metered distribution of feed by conventional feed distribution machines thus often results in wastage due to excessive distribution of feed where it is not needed or where the feed has not been consumed for some reason.

Conventional animal feed distribution devices are constructed to distribute predetermined amounts of feed into the feed trough without regard to the accumulation of feed in the trough. U.S. Pat. No. 3,561,404 discloses an animal feeder which distributes feed into a feeding trough by means of a sweep shuttle which sweeps granular feed from a central distribution point and urges the feed along the length of the trough with a reciprocating motion. This approach, however, provides no method for determining whether excess feed has accumulated in certain areas of the trough or is deficient in other areas.

U.S. Pat. No. 3,156,215 discloses an apparatus for dispensing feed into a trough by discharging the feed into the trough at a predetermined rate from a bulk container so that similar quantities of feed are distributed evenly at successive positions along the trough. Although the feed is metered into predetermined quantities for distribution, no technique is disclosed for preventing discharge of the predetermined amount at a position having an accumulation of feed which has not been consumed.

SUMMARY OF THE INVENTION

The present invention provides an improved animal feed hopper for dispensing animal feed into a feed trough which includes a bulk feed container for holding the feed, a discharge outlet for delivering feed from the container into the trough, a power driven feed agitator which urges the feed into the discharge outlet under the influence of a power drive, a feed accumulation detector which detects the accumulation of feed in the trough beneath the discharge outlet, and a mechanism for disabling the feed agitator when an accumulation of feed has been detected.

The preferred embodiment of the feed hopper of the present invention comprises a helical wire auger feed agitator which rotates within the bulk feed container and urges feed at a predetermined rate towards the discharge outlet of the hopper as the auger rotates under the influence of a power drive. An elongate spout directs feed exiting the discharge outlet into the feed trough. A feed level detecting paddle is positioned within the feed hopper adjacent the discharge outlet and above the spout so that an accumulation of feed in the trough which impedes the free flow of feed through spout and into the trough causes the auger to force feed against the paddle, thereby displacing it away from its rest position. The paddle, when so displaced, stops the rotation of the auger and a slip clutch connection between the auger and the power drive permits the continued operation of the power drive. This terminates the movement of feed to the trough. The slip clutch connection continues to permit the power drive to rotate while the auger rotation has been arrested until the discharge outlet is positioned at a point along the trough where there is no accumulation of feed which impedes the free flow of feed through the spout and into the trough. When the feed within the discharge spout flows into the trough and allows the paddle to move under the influence of a counterweight away from the displaced position, the rotation of the auger is no longer impeded by the paddle and the auger once again urges feed at the predetermined rate towards the discharge outlet. Thus, the present invention thus provides a method and apparatus for delivering feed to an elongated feed trough extending along a row of cages which assures a sufficient quantity of fresh feed to all birds in the cages while eliminating the dispensing of feed to the feed trough at positions where the feed has accumulated from a prior feed dispensing cycle.

A plurality of feed hoppers constructed in accordance with the present invention, one hopper for each row of vertically-stacked cages, can be mounted upon a travelling feed trolley which traverses the length of the feed troughs for distributing feed into the trough. All feed hoppers on the feed trolley can be driven in parallel by a chain, belt, or the like from a power source. A feeding system employing feed hoppers constructed in accordance with the present invention in conjunction with such a travelling feed trolley can be advantageously combined with a time clock, to cause the feed trolley and hoppers to distribute feed at predetermined intervals, thereby further reducing waste by not overfeeding and allowing feed to build up the trough.

Accordingly, it is an object of the present invention to provide an improved animal feed hopper.

It is another object of the present invention to provide an animal feed hopper which automatically distributes feed to a feeding trough in predetermined amounts while simultaneously preventing undesirable accumulation of feed at points along the feeding trough.

It is another object of the present invention to provide an automatic animal feed hopper for distributing feed to a trough which detects the level of feed within the trough and prevents distribution of feed at points along the trough where feed has accumulated above a predetermined level.

It is another object of the present invention to provide an animal feed hopper capable of detecting the accumulation of feed in a feed trough beneath the hopper and arresting the rotation of the feed agitator when an undesirable accumulation of feed is detected, and further capable of automatically restoring the rotation of the feed agitator when the accumulation of feed has been passed and further distribution of feed is desired.

It is another object of the present invention to provide an animal feed hopper which automatically shuts off the flow of feed to a feed trough when the hopper passes over an accumulation of feed in the trough and automatically reestablishes the flow of feed to the feed trough when the feed hopper has passed over the point of accumulation of feed and has reached a point where a deficiency of feed exists.

It is another object of the present invention to provide an automatic animal feed hopper capable of being assembled together with other similar animal feed hoppers in an animal feed trolley which traverses the length of a plurality of parallel feed troughs and distributes feed therein in predetermined amounts.

Other objects, features and advantages of the present invention will become apparent upon reading the following specification of a preferred embodiment and upon reviewing the accompanying drawings.

DETAILED DESCRIPTION OF THE PREFERRED EMBODIMENT

Figure 1:
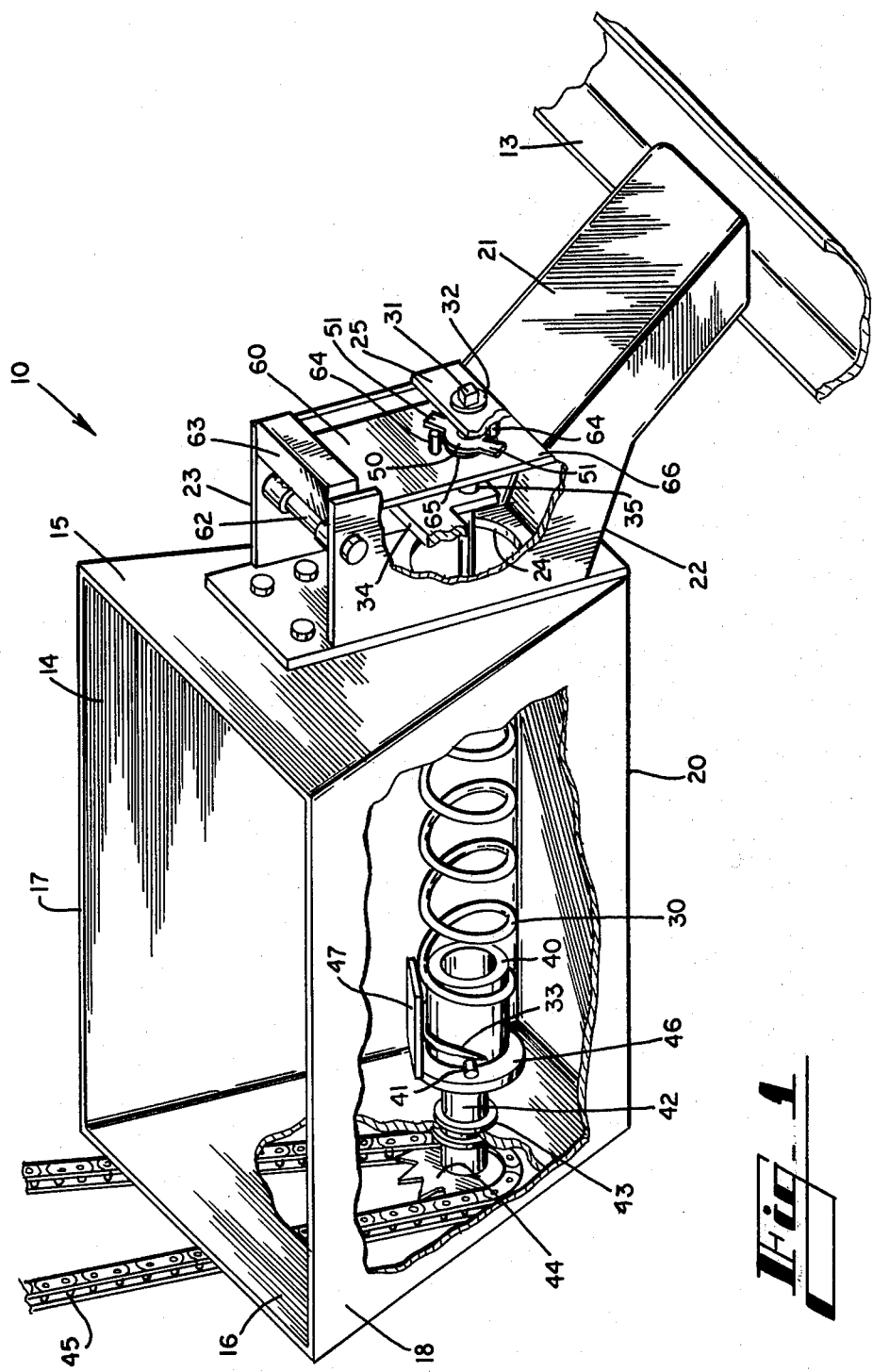
FIG. 1 is a partial perspective view of a preferred embodiment of the animal feed hopper constructed in accordance with the present invention.

Referring now in more detail to the drawings, in which like numerals indicate like parts throughout the several views, FIG. 1 shows a preferred embodiment 10 of an animal feed hopper constructed in accordance with the present invention and which comprises a bulk feed container 14 for containing a quantity of feed to be distributed into an elongate rectilinear animal feed trough 13 which is approximately U-shaped in cross section. The hopper 10 is intended to be mounted on a conventional feed trolley (not shown) capable of transporting and providing power for a plurality of hoppers for a corresponding number of feed troughs. The trolley travels the length of the feed troughs, allowing the feed hoppers mounted thereon to distribute feed into the troughs.

The bulk feed container 14 has an upright front wall 15 for movement adjacent the feed trough, and an upright rear wall 16, and the front and rear walls 15 and 16 are joined at their side edges to downwardly converging left side wall 17 and right side wall 18 and at their lower edges to bottom wall 20 to form an approximately rectangular box open at its top. The bottom wall 20 of the container is essentially rectangular and is narrower in width than the width of the container at top. It is thus apparent that the side walls 17, 18 of the container 14 slope inwardly from the top of the container towards the bottom so that the feed introduced into the container is directed towards the bottom of the container.

Mounted to the front wall 15 of container 14 is a housing 23 which extends outwardly from the container toward the trough 13 and contains the components of the auger drive disconnect mechanism, discussed in greater detail below. The interior of the housing 23 communicates with the interior of container 14 by a circular opening 24. Feed from the container is urged from the container into the housing through the opening. A front wall 25 of the housing is disposed towards the trough into which feed is to be directed.

The bottom of housing 23 comprises an elongate spout 21 which extends downwardly at an angle away from the container, for directing feed from the bottom of the container and housing into the trough 13. The spout is disposed extending outwardly in a depending position beneath the housing so that feed introduced into the housing from container 14 will drop from the housing through the spout into the trough. The spout connects to the container by an inclined ramp 22, which slopes downwardly at an angle from the bottom wall 20 of the container so as to urge feed which enters the housing from the container to depart through the spout. It will thus be appreciated that feed which is urged by feed agitation means through opening 24 into housing 23 will upon encountering the ramp 22 move downwardly under the influence of gravity and will thereby be directed into the spout 21, and thus into the trough.

A heavy gauge helical wire auger 30 is disposed along the bottom of the feed container 14 and extends longitudinally between the front wall 15 and the rear wall 16 of container 14. The auger has an elongate straight stem 31 which is coaxial with the helix of the auger and extends through the front wall 15 of the container into housing 23, where the stem terminates in a bushing 32 which rotatably supports the stem in the front wall 25 of housing 23 and permits rotation of the entire auger.

The stem is further supported within the housing 23 by a supporting member 34, which extends transversely between the sides of the housing between the front wall 25 of the housing and the front wall 15 of container 14, and which is suspended over the ramp 22. A bearing 35 rotatably supports the stem 31 in the supporting member 34.

The helical portion of auger 30 extends longitudinally from the stem 31 between the front wall 15 and rear wall 16 of container 14. The end of the auger adjacent rear wall 16 extends about a cylindrical spool 40 which is coaxial with the auger. The final few turns of the auger 30 wrap circumferentially about the spool.

A collar 46 having a diameter larger than spool 40 is affixed to the spool adjacent the rear wall 16 of container 14. An elongate horizontal auger guide 47 is mounted tangentially to the collar and is disposed horizontally towards the front wall of the container. The auger guide confines the auger between the guide and spool 40.

A cylindrical ear 41 is affixed to collar 46 extending radially from the surface of spool 40. The ear is placed on the collar so that the end 33 of auger 30 frictionally engages the ear as the collar and ear rotate. The collar, spool, guide and ear rotate as a unit, and rotary power is frictionally transmitted to auger 30 by contact with ear 41 as the ear and collar rotate. Should the auger be rigidly held so that it cannot rotate, the force of rotation of the collar and ear compresses the helical spring-like auger 30, and the end portion of the auger rides over the ear and the ear 41 will slide past the end 33 of the auger. As the ear passes beyond the auger end, the compression of the auger forces the end outwardly toward the collar. Thus, when the ear completes its rotation and encounters the auger end again, the ear and auger will frictionally engage. If the auger has been freed to rotate, the friction between the ear and the auger end is sufficient to cause the rotation of the auger and the consequent agitation of feed in the container. However, should the auger still be held immobilized, the ear again slips by the auger end and continues its rotation under the influence of rotary power. It will thus be appreciated that ear 41 and auger end 33 provide a slip clutch drive for the auger.

Spool 40 and collar 46 are supported at rear wall 16 of container 14 by a shaft 42, which is coaxial with and extends from the collar through the rear wall of the container. The shaft is supported rotatably in the rear end by a bearing 43. A sprocket 44 is rigidly affixed to the end of the shaft 42 on the exterior of the container. Rotary power is imparted to the sprocket, the shaft, and consequently the spool and collar through a chain, belt, or the like 45 which is connected to a source of rotary power (not shown). It will be appreciated that by controlling the rate of rotation of the sprocket, and hence the spool and collar, the rate of rotation of the auger is controlled, thereby determining the rate of agitation of the feed and the rate at which the feed is urged into the trough.

It will be further appreciated that the rate at which feed is distributed along the length of the trough is dependent upon the rate at which feed is urged into the trough together with the rate at which the hopper, carried by a conventional trolley in the known manner, advances along the trough. It may therefore be seen that the amount of feed deposited into the trough may be controlled by coordinating the rate of travel of the hoppers with the rate of rotation of the auger and by varying the height of the spout from the bottom of the trough.

Affixed to the stem 31 of auger 30 adjacent the bushing 32 is a wheel 50 having a plurality of tabs 51 extending radially outwardly from the center of the wheel. The wheel is rigidly attached to the stem so that the wheel rotates with the stem and auger and so that an object interposed within the rotary path of a tab would tend to prevent rotation of the wheel and the stem, and would thereby tend to prevent the auger from rotating.

A paddle 60 is pivotally suspended from the top of housing 23 and extends downwardly between the front wall 25 of housing 23 and the supporting member 34, and is positionable adjacent wheel 50 or adjacent the supporting member. The lower end 66 of the paddle is disposed over the point at which the spout 21 joins the ramp 22 of the housing. A hinge pin 62, extending transversely between the sides of housing 23 between the front wall 25 and supporting member 34, pivotably suspends paddle 60. A counterweight 63 is affixed to the paddle at the point at which the paddle is suspended. The counterweight is disposed forwardly towards the front wall 25 of housing 23 so that the natural tendency of the counterweight is to move downwardly toward the spout thereby exerting force which tends to move paddle 60 away from the front wall 25 of the housing and the wheel, and toward the supporting member 34. It will be appreciated that the quiescent position of paddle 60 is adjacent the supporting member, and the force of the counterweight tends to hold the paddle in this position.

Paddle 60 has a hole 65 through which the stem 31 of auger 30 protrudes. A plurality of protrusions 64 adapted to engage with the tabs 51 of wheel 50 are disposed about hole 65 extending outwardly from the paddle toward the front wall 25 of the housing 23. Should the paddle move towards the wheel, the protrusions 64 will engage with the tabs and tend to arrest the rotation of the wheel. It will thus be appreciated that any force which resists the counterweight will tend to move the paddle toward the wheel and cause the protrusions 64 to engage with the tabs in the wheel, thereby impeding the rotation of the wheel and auger. It will be further appreciated that feed will not be agitated and urged by the auger toward the spout while the auger is held immobilized by the protrusions of the paddle.

Normally, feed is urged along the bottom of the container 14 through opening 24, along ramp 22, and into spout 21 by the rotation of auger 30. However, should feed accumulate within the spout due to an accumulation of feed in the trough so that feed which has been urged onto the ramp 22 towards the spout 21 can no longer readily fall along the ramp towards the spout, an accumulation of feed will occur along the ramp due to the urging of auger 30. An accumulation of feed will thus occur immediately beneath supporting member 34 and behind the lower end 66 of paddle 60. Should feed continue to be urged by the auger towards the ramp and continue to accumulate behind the paddle 60, the auger will force feed against the paddle and tend to push the paddle away from its quiescent position adjacent supporting member 34 towards the front wall 25 of the bushing 23. The paddle will thus swing forwardly toward wheel 50, pivoting about the axis of hinge pin 62. When the protrusions 64 engage with the tabs of the wheel, the wheel 50 and consequently the auger 30 will be prevented from rotating. The auger end 33, held immobilized, will thus ride over the ear 41 of collar 46 as the collar and spool continue to rotate under the influence of the power source.

It will be appreciated that feed will accumulate within the spout and cause the auger to force feed against the paddle only if there is an accumulation of feed in the trough which impedes the free flow of feed into the trough. Thus, the paddle and its protrusions provide means for detecting the accumulation of feed within the trough. Moreover, the slip clutch drive between the ear 41 and auger end 33 provides means for disconnecting the drive to the helical feed agitating auger, which consequently cuts off the flow of feed into the trough.

At such time as the hopper 10 has passed beyond an accumulation of feed in the trough 13, the accumulation of feed behind the paddle will begin to move down the spout 21 and into the trough. When the build-up of feed has diminished sufficiently so as to allow paddle 60 to move, the paddle will swing away from wheel 50 under the influence of counterweight 63 towards the quiescent position adjacent supporting member 34, thereby freeing the wheel 50 and the auger 30 to rotate. The auger end 33 will again frictionally engage ear 41 and the auger will again rotate and agitate the feed and urge the feed through opening 24 toward the ramp 22 and spout 21. The flow of feed therefore will be restored to the trough, at the rate determined by the rate of rotation of the auger.

Figure 2:
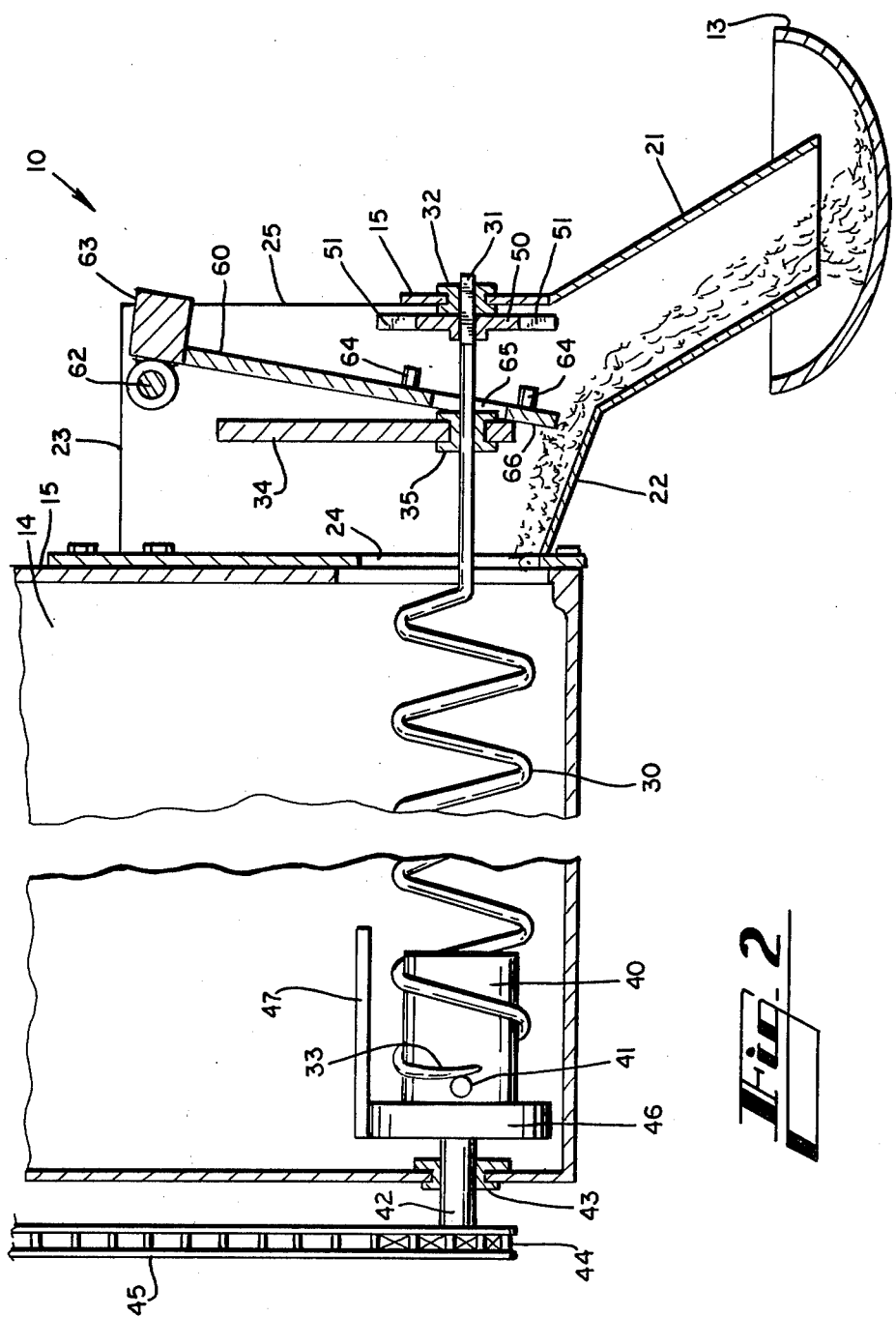
FIG. 2 is a side cross-sectional view of the feed hopper of FIG. 1.

FIG. 2 is a side cross-sectional view of the embodiment of FIG. 1 showing the paddle 60 in the quiescent position adjacent supporting member 34, disengaged from the tabs 51 of wheel 50. The paddle and its protrusions 64 may be seen to be held away from engagement with the tabs by virtue of the counterweighting action of counterweight 63.

Figure 3:
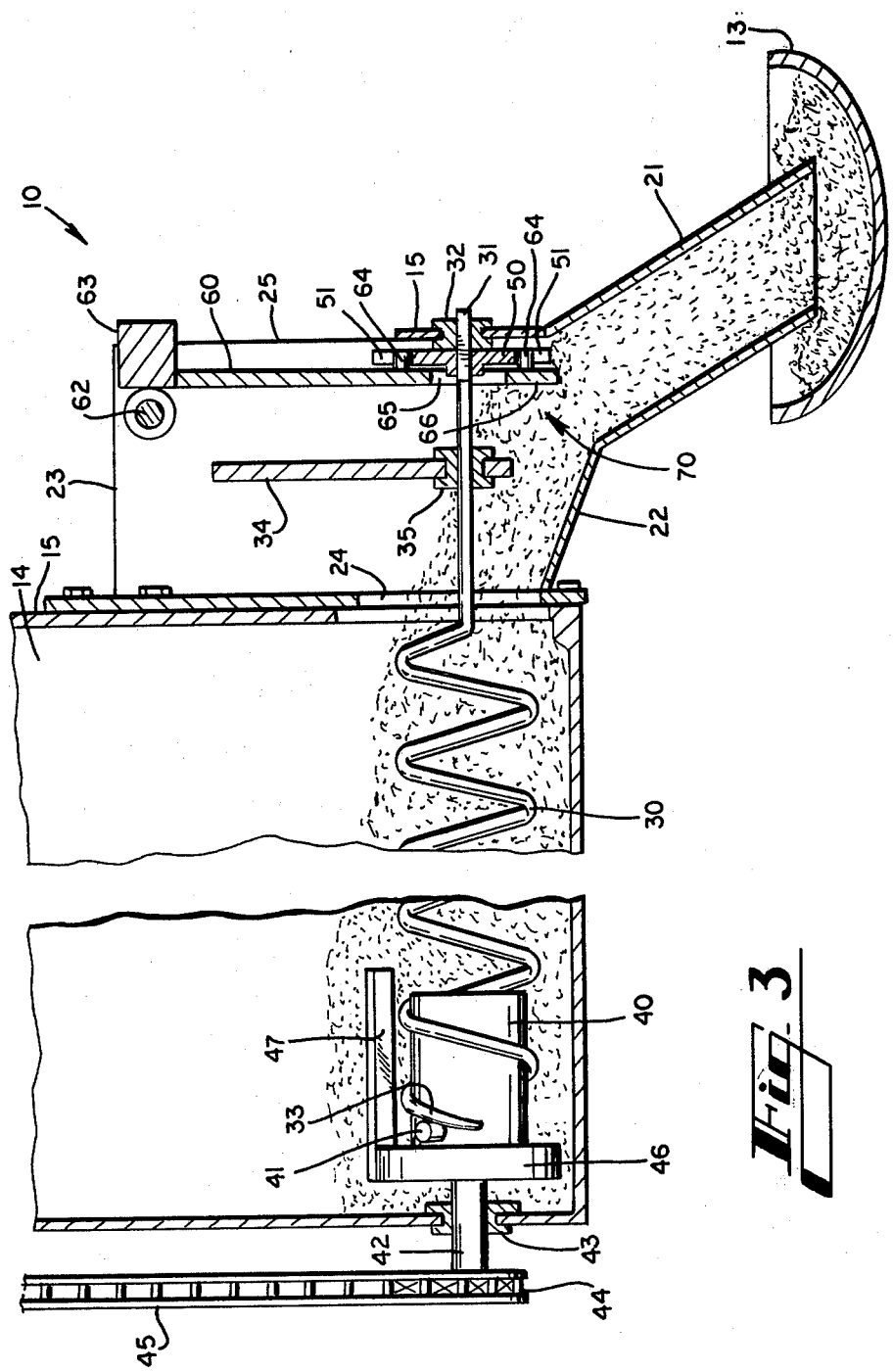
FIG. 3 is a side cross-sectional view of the feed hopper of FIG. 1, showing the feed cutoff mechanism actuated.

FIG. 3 is a side cross-sectional view of the embodiment of FIG. 1 showing the paddle 60 being forced by accumulated feed 70 towards the front wall 25 of housing 23 so that the protrusions 64 on the paddle are forced into engagement with the tabs 51 of wheel 50. It is in this engaged position that rotation of the wheel and the attached stem 31 of auger 30 are prevented from rotation so that ear 41 slips beneath the auger end 33. Consequently, the auger does not rotate and does not urge feed toward the spout 21 until such time as the accumulated feed 70 has discharged itself through the spout into an area in the trough 13 which does not have an accumulation of feed.

It is to be understood that while a preferred embodiment has been illustrated and described herein, other alternative configurations or modifications may occur to those skilled in the art and what is intended to be covered herein is not only the illustrated form of the invention, but also all modified forms thereof as may come within the scope and spirit of this invention as hereinbefore described and defined in the following claims.

I claim:

1. In an animal feed hopper for moving along and dispensing animal feed into an elongate feeding trough comprising a bulk feed container for holding a quantity of feed, said container having a downwardly directed discharge spout for delivering the feed from said container into the trough, agitator means for urging the feed laterally from said container into said discharge spout and thence into the trough as said hopper travels along the length of the trough, and agitator drive means for imparting motion to said agitator means, the improvement comprising:

said agitator means and said agitator drive means including agitator drive disconnect means releasably connecting said agitator drive means to said agitator means, a paddle member suspended in the path of the feed as the feed moves laterally from the bulk container through said discharge spout, said paddle member being constructed and arranged to move into mechanical locking engagement with said agitator means in response to the accumulation of feed in said discharge spout and to the continued movement of the feed by said agitator means laterally into said discharge spout for holding the agitator means against motion until the accumulation of feed in the spout has been depleted.

2. An apparatus for distributing animal feed along the length of an elongate feed trough, comprising in combination:

a container for containing a supply of feed, said container provided with a discharge outlet at one end thereof and a spout communicating with said outlet and extending downwardly from said outlet for delivering the feed into the trough, agitation means extending between opposite ends of said container and supported therefrom for rotation, for urging feed in said container through said discharge outlet whereby the feed flows downwardly through the spout to the feed trough;

power means releasably connected to said agitation means for rotating said agitation means;

a paddle member suspended in the path of the feed as the feed moves from said container and through said spout and movable into mechanical locking engagement with said agitation means in response to an accumulation of feed in said spout;

whereby the agitation means is held by the paddle member and prevented from being rotated by the power means until the accumulation of feed is removed from the spout.

3. The apparatus of claim 2 and wherein said power means comprises a spool rotatable about its longitudinal axis, and wherein said agitation means comprises an auger conveyor with a helical end portion that extends about said spool, said spool including a protrusion for engaging and rotating said helical end portion.

4. In an animal feed hopper for dispensing animal feed into an elongate feeding trough comprising:

a bulk feed container for holding a quantity of feed, a discharge outlet in the bottom of said container for delivering feed from said container into said trough;

helical agitator means rotatably suspended within said container for urging feed into said discharge outlet and thence into said trough as said hopper travels the length of said trough;

helical agitator drive means for rotating said helical agitator means to urge feed into said discharge outlet;

an axle coaxial with said helical agitator means for supporting said helical agitator means within said container;

detent engaging means coaxial with said axle;

slip clutch means affixed to said helical agitator means, for transmitting rotary motion from said helical agitator drive means to said helical agitator means when said helical agitator means is free to rotate;

a dependent counterweighted pivoting paddle having a lower edge suspended at a predetermined level over said discharge outlet where said discharge outlet joins said container with the lower portion of said paddle capable of displacement towards and away from said detent-engaging means, and said paddle having detent means affixed to said paddle positionable adjacent said detent-engaging means for engaging with said detent-engaging means when said paddle is displaced towards said detent-engaging means, whereby when feed accumulates in said discharge outlet above said predetermined level, said helical agitator means urges feed against said paddle, said paddle is displaced towards said detent-engaging means, said detent means of said paddle engages said detent-engaging means, thereby retarding the rotation of said helical agitator means and causing said slip clutch means to slip until the accumulation of feed has fallen below said predetermined level, whereupon said paddle pivots under the influence of its counterweight away from said bushing and said detent-engaging means, said detent disengages from engagement with said detent-engaging means and allows said helical agitator means to rotate, and said slip clutch means transmits rotary motion from said helical agitator drive means to said helical agitator means.

5. An apparatus for distributing animal feed along the length of an elongate feeding trough comprising in combination:

a feed hopper for containing a supply of feed;

a discharge outlet affixed to said hopper for delivering feed to said trough;

elongate helical wire auger means suspended within said hopper for urging feed in said hopper towards said discharge outlet, said auger means having an axle affixed at one end and terminating in a coiled end at the other end;

a wheel firmly affixed to said axle of said auger means including at least one tab extending radially outwardly;

a rotatable spool coaxial to said auger means having a diameter smaller than the diameter of said auger means and rotatably contained by said auger means, said spool including at least one protruding ear adjacent said coiled end of said auger means for engaging said coiled end of said auger means when said spool is rotated;

spool drive means for rotating said spool and said auger means when said protruding ear of said spool engages said coiled end of said auger means;

a pendulous counterweighted paddle suspended over said discharge outlet swingingly positionable adjacent said tab on said wheel, said paddle comprising at least one detent adapted to engage said tab of said wheel when said paddle swings adjacent said tab, whereby when feed accumulates in said discharge outlet due to the presence of feed in said trough, said auger means urges feed against said paddle and swings said paddle towards said wheel, said detent of said paddle engages said tab of said wheel and retards the rotation of said wheel and said auger means, and said coiled end of said auger means disengages from said protruding ear of said spool, thereby retarding the urging of feed by said auger means towards said discharge outlet until the accumulation of feed has diminished.

* * * * *